United States Patent [19]

Kazkaz

[11] 4,400,053

[45] Aug. 23, 1983

[54] OPTICAL FIBER COUPLER

[76] Inventor: Ghaffar Kazkaz, 5 South Hatlen, Mount Prospect, Ill. 60056

[21] Appl. No.: 167,356

[22] Filed: Jul. 10, 1980

[51] Int. Cl.³ .............................................. G02B 7/26
[52] U.S. Cl. ............................... 350/96.15; 350/96.21
[58] Field of Search ........................... 350/96.21, 96.15

[56] References Cited

U.S. PATENT DOCUMENTS 4,220,398  9/1980  Dalgoutte ........................ 350/96.21

Primary Examiner—Eli Lieberman
Attorney, Agent, or Firm—McCaleb, Lucas & Brugman

[57] ABSTRACT

An optical fiber coupler in which adjacent end portions of two optical fibers are inserted predetermined coupling lengths into recesses in opposite and portions of a tubular waveguide. Each optical fiber comprises an optical fiber guiding core with outer cladding. The tubular waveguide comprises an annular cross-section tubular guiding core with inner and outer cladding. The adjacent end portions of the optical fiber guiding cores are aligned with one another along the axis of the tubular waveguide and are disposed concentrically within it. Their adjacent end surfaces may be spaced apart, or may abut. The optical fibers are fixed with their guiding cores concentrically aligned within the tubular waveguide guiding core by a spacer member. The optical fiber guiding cores and the tubular waveguide guiding core have the same refractive index, for example, 1.500. The spacer member and the cladding materials have a lower refractive index, for example, 1.495. Optimum relationships between the physical and optical parameters of the coupler are defined for maximum optical power tranmission. These are expressed as equations in which unknown parameters such as the thickness of the tubular waveguide guiding core, and the coupling lengths (namely, the distances the optical fiber guiding cores are inserted into the tubular waveguide) can be determined from known parameters.

16 Claims, 4 Drawing Figures

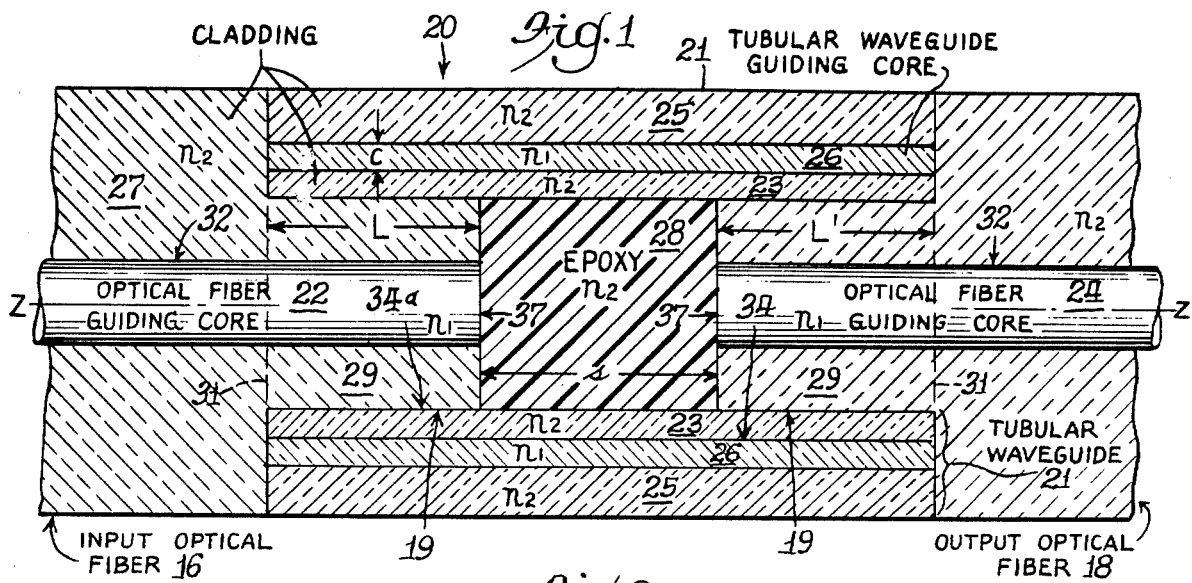
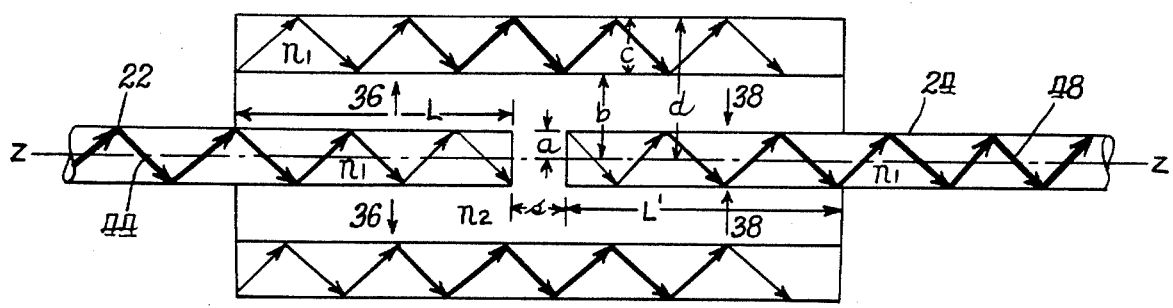
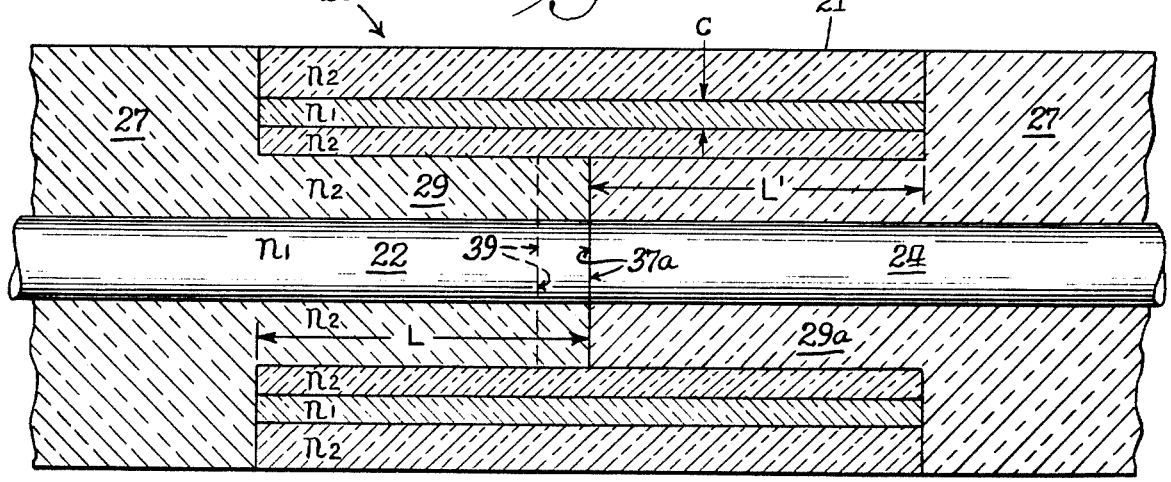
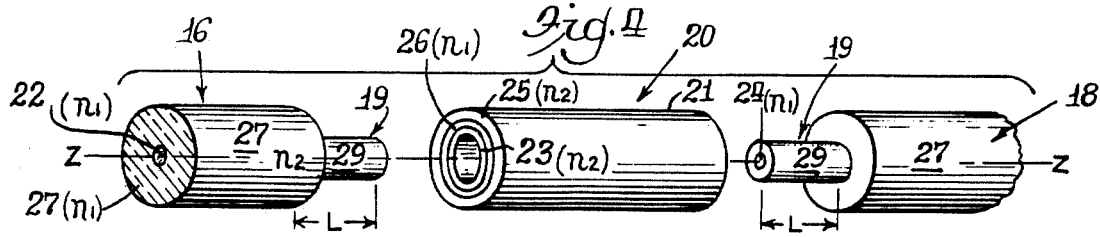

OPTICAL FIBER COUPLER

BACKGROUND OF THE INVENTION

In modern electronic engineering for computer and communication systems there is an increasing need for higher frequency devices and channels to handle signals with frequencies of $10^8$ Hz or higher. Optical waveguides and fibers are being given serious consideration as a response to that need.

Optical waveguides and fibers guide information-carrying laser beams at optical frequencies. The useable range of light wave lengths is much broader than the visible wave lengths, 4,000–7,000 Ångstrom units. Useable optical wave lengths extend substantially into the ultra-violet range below 4,000 Ångstroms and into the infra-red range above 7,000 Ångstroms.

There are two major kinds of optical waveguides as follows.

Rectangular Cross Section Wave Guides

They are used in optical integrated circuits, made on optical chips. They are rectangular strips of dielectric material embedded in a substrate of another dielectric material. The optical wave propagating along the waveguide is contained in the rectangular strip (guiding core) which has a refractive index greater than that of the substrate. The technology used in integrated optics is similar to the technology of semiconductor integrated circuits.

Round Cross Section Optical Fibers

They are used in communication systems to carry information over long and short distances like transmission lines and coaxial cables but at higher frequencies. The guiding core is a uniform cylinder of dielectric material with a refractive index greater than that of the surrounding medium (cladding). The laser beams carrying information are guided and contained in the guiding core.

Both the rectangular cross section optical waveguide and the round cross section optical fiber or core, with which the present invention is concerned, have been studied extensively in recent years. A certain number of modes can be supported by an optical waveguide, fiber or core. The propagation properties of each mode (phase constants, impedance, etc.) depend on the cross sectional dimensions, on the refractive index of the light-guiding core, and on the refractive index of the surrounding medium or cladding. For detailed descriptions and a good bibliography see S. E. Miller, E. A. J. Marcatili and T. Li, Research Toward Optical-Fiber Transmission Systems, Parts I and II, Proceedings of the IEEE, pp. 1703–1751, 1973.

There are occasions where optical fibers have to be joined to transfer optical power from one to the other. Conventional fiber joining techniques fall into two categories: longitudinal coupling involving joining the fibers end to end; and transverse coupling, involving lapped, tapered fiber end portions. These will be described briefly below.

Longitudinal Coupling

A good reference describing this technique is the article written by D. L. Bisbee, Optical Fiber Joining Technique, B.S.T.J. Volume 50, No. 10, pp. 3153–3158, 1971. By this technique, the two waveguides or fibers are joined end to end in an abutting relationship. A highly accurate alignment, perfect end polishing, and tight connections are required. A matching liquid (epoxy) of the same refractive index as the guiding core is applied between the fibers before joining them in order to minimize reflection and radiation at the junction.

Transverse Coupling

Transverse coupling has attracted the attention of many researchers and many constructions have been tried. The most popular involves a tapered structure in which the ends of the two fibers are tapered and placed parallel and pressed together, also with a matching epoxy liquid at the juncture.

Both the above conventional coupling techniques leave much to be desired. They are purely empirical and high coupling efficiency is difficult to obtain especially for single mode fibers. Further, efficiencies vary widely from one manufacturer to another. This situation accordingly is in need of an improvement.

SUMMARY OF THE INVENTION

Therefore a principal object of the present invention is to provide a coupler for optical fibers whose parameters and coupling are governed by theoretical formulas which can be 100% efficient for single mode fibers and can be used as a mode filter for multimode optical fibers.

Another object is to provide an optical fiber coupling which does not rely upon actual physical contact or intimate proximity of two fibers to provide 100% optical energy transmission from one fiber to the next.

Another object is to provide an optical fiber coupler which involves a specific application of the principle of "transverse coupling" in which optical power is transferred transversely of the axis through a gap between an input or output optical fiber guiding core and a surrounding tube-shaped tubular waveguide guiding core.

Another object is to provide optimum relationships between parameters of such an optical fiber coupler enabling one skilled in the art to determine the thickness of the tubular waveguide guiding core surrounding the optical fiber end portions, and the coupling lengths of the fibers, that is, the distances they are inserted into the tubular waveguide.

Further objects of the invention will appear as the description proceeds.

To accomplish the above and related objects, this invention may be embodied in the form illustrated in the accompanying drawings, attention being called to the fact, however, that the drawings are schematic and intended only to illustrate the principles involved, and that changes may be made in the specific construction illustrated and described within the scope of the appended claims.

BRIEF DESCRIPTION OF THE DRAWING FIGURES

FIG. 1 is a longitudinal cross section of an optical fiber coupler according to the present invention;

FIG. 2 is a view similar to FIG. 1 illustrating the special "transverse coupling" principle employed to transfer optical power between input and output fibers, this figure showing only input and output optical fiber guiding cores, and a tubular waveguide guiding core, without any cladding or coating materials, to simplify the illustration;

FIG. 3 is a view similar to FIG. 1 illustrating an alternate form of the invention; and FIG. 4 is an exploded perspective view of the optical fiber coupler shown in FIG. 1.

DETAILED DESCRIPTION OF PREFERRED EMBODIMENTS

Referring now to the drawing figures in greater detail, FIG. 1 shows an optical fiber coupler 20 which illustrates one form of the present invention. An input optical fiber 16 comprises an optical fiber guiding core 22 coated with cladding material 27. An output optical fiber 18 comprises an optical fiber guiding core 24 similarly coated with cladding material 27. Optical fiber guiding cores 22 and 24 are aligned along an axis z—z. They extend distances L and L' respectively, into opposite end portions of a tubular waveguide 21. The distances L and L' are equal in the embodiment illustrated in FIG. 1, to simplify the description; but this is not a necessary requirement. These are important, critical dimensions, referred to hereinafter as "coupling lengths" and their optimum values are important to the present invention. Determination of optimum values will be described later herein in detail.

The tubular waveguide 21 comprises a tubular guiding core 26 coated inside with cladding material 23 and outside with cladding material 25.

One convenient way of producing the coupler 20 is to reduce the diameter of the leading end of each optical fiber 16 and 18 by mechanical machining or chemical etching to provide a plug 29 having an outside diameter 19 which fits snugly within the tubular waveguide inner surface 34a, this being the inner wall surface of the inner cladding 23. The input and output optical fibers 16 and 18 are maintained in fixed axial alignment along axis z—z, and the optical fibers are maintained in fixed, concentric relationship with the tubular waveguide 21 by an optical spacing member 28. The latter may be an epoxy cement of proper optical qualities which is applied as a liquid and hardened in place.

The input and output optical fiber guiding cores 22 and 24, the tubular waveguide guiding core 26, and the spacing member 28 may be glass, "Lucite" plastic, quartz, epoxy or other light-transmitting material having a suitable refractive index.

The optical fiber guiding cores 22 and 24 and the tubular guiding core 26 will preferably be made of light-transmitting material having the same refractive index. This refractive index is indicated $n_1$ in the drawings and, typically, may be 1.500.

The cladding materials 23, 25 and 27 may be any conventional coating suitable for the cores 22, 24 and 26. These cladding materials, and the material comprised in the spacer member 28, will have refractive indexes less than that of the guiding cores. For convenience in this description, they will be considered equal. Their refractive index is indicated $n_2$ in the drawings and, typically, may be 1.495.

The input optical fiber 16 may be connected to receive light in one or more modes from a coherent light source such as a laser (not shown); alternatively, the input optical fiber may itself be a component of a laser.

The reduced-diameter plug extensions 29 (and 29a in FIG. 3) of the cladding 27 have a dual function: they maintain a precise concentric relation between the optical fibers 16, 18 and the tubular waveguide 21; and, inasmuch as they have the same refractive index $n_2$, they act as optical extensions of the spacer member 28 (or they may replace 28 entirely as shown in FIG. 3). Alternatively, the optical fiber guiding cores 22 and 24 may be stripped back distances L and L', to the broken lines 31 shown in FIG. 1, and the epoxy 28 may completely fill the circumferential gaps between the stripped ends of the cores 22, 24 and the tubular waveguide 21, and the axial gap s between the end surfaces 37, 37 of the optical cores.

I have discovered a number of optimum relationships between certain parameters of the coupler 20 which provide 100% transfer of light power from the input fiber to the output fiber in single mode use, and greatly improved efficiency or mode filtering in multimode use. These relationships also apply to the alternative embodiment shown in FIG. 3 and are expressed mathematically by the following equations:

$$(n_1^2 - n_2^2)K^2 = k^2 + \gamma^2 \tag{1}$$

$$kJ_0(ka)K_1(\gamma a) + \gamma J_1(ka)K_0(\gamma a) = 0 \tag{2}$$

where $J_0(x)$ and $J_1(x)$ are Bessel functions of the first kind and $K_0(x)$ and $K_1(x)$ are modified Bessel functions.

$$\frac{kJ_0(kb)I_1(\gamma b) - \gamma J_1(kb)I_0(\gamma b)}{kN_0(kb)I_1(\gamma b) - \gamma N_1(kb)I_0(\gamma b)} = \tag{3}$$

$$\frac{kJ_0(kd)K_1(\gamma d) + \gamma J_1(kd)K_0(\gamma d)}{kN_0(kd)K_1(\gamma d) + \gamma N_1(kd)K_0(\gamma d)}$$

where $N_0(x)$ and $N_1(x)$ are Bessel functions of the second kind and $I_0(x)$ and $I_1(x)$ are modified Bessel functions.

$$L = \frac{2\beta}{k^2} \arctan \frac{2K\gamma}{k^2 - \gamma^2} U \arctan U \tag{4}$$

where $\beta$ is the longitudinal phase constant given by (4a)

$$\beta = \sqrt{n_1^2 K^2 - k^2}$$

and $U$ is given by $U = \dfrac{|R|}{\sqrt{1 - |R|^2}}$ (4b)

R is the reflection coefficient at the surfaces 32 of the optical fiber guiding cores 22 and 24 and the inner wall of the tubular waveguide guiding core 26. $|R|$ is the absolute value of R and is determined from the following equation:

$$|R|^2 = \frac{[X(a)U(b) - X(b)U(a) + V(a)W(b) - V(b)W(a)]^2 + [U(a)W(b) - U(b)W(a) + V(a)X(b) - V(b)X(a)]^2}{[X(a)U(b) - X(b)U(a) - V(a)W(b) + V(b)W(a)]^2 + [U(a)W(b) + U(b)W(a) - V(a)X(b) - V(b)X(a)]^2} \tag{5}$$

where $U(x)$, $V(x)$, $W(x)$ and $X(x)$ are combinations of Bessel functions as follows:

and $U(x) = kxJ_0(kx)K_1(\gamma x) + \gamma x J_1(kx)K_0(\gamma x)$
$V(x) = kxN_0(kx)K_1(\gamma x) + \gamma x N_1(kx)K_0(\gamma x)$
$W(x) = kxJ_0(kx)I_1(\gamma x) - \gamma x J_1(kx)I_0(\gamma x)$ $$X(x) = kxN_0(kx)I_1(\gamma x) - \gamma x N_1(kx)I_0(\gamma x) \quad (5)$$

Summarizing the parameters in the above equations, they are as follows:

- $a$ = radius of the guiding cores 22 or 24 of the input and output fibers, in microns.
- $b$ = inner radius of the tubular waveguide guiding core 26, in microns. (For best results, this should be 3a or greater.)
- $c = d - b$ = thickness of the guiding core 26 of the tubular waveguide, in microns.
- $d$ = outer radius of the tubular waveguide guiding core, 26, in microns.
- $L$ = coupling length of input optical fiber 16, i.e. the distance it extends into the tubular waveguide, in microns.
- $L'$ = coupling length of output optical fiber 18, in microns. (L and L' could be equal or each could be an odd number times the formula (4).)
- $n_1$ = refractive index of optical material in optical fiber guiding cores 22, 24 and in tubular waveguide guiding core 26.
- $n_2$ = refractive index of cladding materials 23, 25 and 27 and the spacer 28.
- $\lambda$ = wavelength of light transmitted through the optical fibers and the tubular waveguide, in microns.
- $K$ = wave vector of light = $(2\pi/\lambda)$, in reciprocal microns, $\mu m^{-1}$.
- $k$ = transverse propagation constant, in reciprocal microns $\mu m^{-1}$.
- $\gamma$ = transverse attenuation constant, in reciprocal microns, $\mu m^{-1}$.
- $\beta$ = propagation phase constant in the longitudinal direction, that is, parallel to the axis z—z.
- $R$ = reflection coefficient at surfaces 32 and 34.

There is an optimum dimension for the thickness $c = d - b$ of the tubular waveguide guiding core 26 for which forward transmission of optical power, from input optical fiber 16 to output optical fiber 18 via tubular waveguide 21, is at its maximum. That same optimum thickness also minimizes reverse transmission of optical power. Thus, the net effect is extremely high efficiency. A 100% power transfer can be achieved between fibers 16 and 18 for single mode fibers, and this can be closely approached for multimode fibers.

The optimum for c is determined by assuming a known value for b (3a or larger), then solving Equations 1 and 2 for k and $\gamma$, and inserting those values and the assumed value of b in Equation 3 and solving for d. A specific example will be described in detail.

Likewise, there is an optimum dimension for the coupling length L or L' for which forward transfer of optical power is at its maximum and reverse transfer is at its minimum. This is determined from Equations 4, 4a, 4b and 5 by solving Equation 5 for $|R|$, substituting $|R|$ in Equation 4b to determine the parameter U, then substituting the value of U and the value of $\beta$ (from Equation 4a) in Equation 4. This, too, will be described in detail in connection with the specific example which follows.

One specific example of an improved coupler 20 employing the optimum relationships expressed by the above equations will now be described. The optimum dimensions of c and L or L' will be determined from known parameters in this specific example. Because the coupling lengths L and L' are assumed equal, the portion of the following calculation concerning L will likewise determine L'.

For this specific example, assume the known parameters are
- $a = 5.8526$ microns
- $b = 4a = 23.41$ microns
- $n_1 = 1.5$
- $n_2 = 1.495$
- $\gamma = 1.5$ microns
- $K = (2\pi/\lambda) = 4.189$ microns$^{-1}$ The remaining parameters k, $\gamma$, d and L are readily determined from the relationships expressed by the above equations.

The first step in determining the thickness c of the tubular guiding core 26 is to substitute known parameters in Equations 1 and 2. This leaves only the transverse propagation constant k and the transverse attenuation constant $\gamma$ as unknowns. These are determined by solving Equations 1 and 2 simultaneously and the answers are
- $k = 0.4646$ microns$^{-1}$
- $\gamma = 0.2166$ microns$^{-1}$ The second step in determining the thickness c is to use the propagation and attenuation constants k and $\gamma$ found above to determine the outer radius d of the tubular waveguide guiding core 26. From a purely academic standpoint, the radius b of the inner tubular surface 34 of the core 26 can be chosen at any value from a to infinity. From a practical standpoint however, b should be at least three times the radius a of the optical fiber guiding cores 22, 24. That is, $$b \geq 3a.$$

For this one specific example, b has been chosen as a known parameter equal to 4a. As will be obvious from inspection of the relationships expressed by the above equations, L increases when b increases so b can be chosen on a value for which L is approximately the desired length.

Whatever value is chosen for b, there will be only one thickness c of the tubular waveguide guiding core 26 that will support the same optical transmission mode as the fibers 16 and 18. In other words, once the value of the inner radius b is determined by selection or assumption, there will be only one value of the outer radius d of the tubular core 26 at which there will be 100% forward optical power transfer from input optical fiber 16 to tubular waveguide 21 and from the tubular waveguide to output optical fiber 18.

The other radius d of the tubular waveguide guiding core 26 is determined by inserting the known values of $k = 0.4646$, $b = 23.41$, and $\gamma = 0.2166$ in Equation 3 and solving for the single unknown d. For this specific example, the solution is $$d = 4.328a = 25.33 \text{ microns}$$

The optimum thickness c of the guiding core 26 of the tubular waveguide 21, therefore, is $d - b = 25.33 - 23.41 = 1.92$ microns.

The final step is to determine the coupling length L. This, of course, is the same as L', because they are assumed to be equal in this example.

The coupling lengths L and L' as defined above are the distances which the input and output optical fibers 16 and 18 respectively extend into opposite ends of the tubular waveguide 21. In addition to the thickness c, the coupling length is critical in determining the transmission efficiency between optical fibers 16 and 18. If the coupling lengths are too short, or too long, full optical power transfer, in transverse directions indicated by the arrows 36 and 38 in FIG. 2, cannot develop. When the coupling lengths are precisely the optimum value as determined by Equation 4 above, optical power transfer in the direction of arrows 36 and 38 will peak or maximize somewhat akin to a resonant condition.

Referring to FIG. 2, when the parameters are provided in accordance with the present invention, incoming optical power 44 in input optical fiber guiding core 22 is transferred through the annular gap between guiding cores, in the direction of arrows 36, into the tubular guiding core 26 where it is represented by the arrows 46. The optical power is then re-transferred through the gap, in the direction of arrows 38, into the output fiber guiding core 24 where it is represented by arrows 48.

It is therefore extremely important that the coupling lengths L and L' be properly chosen, and optical power not wasted by making these coupling lengths too short or too long.

In the specific example, the precise, optimum coupling length L is readily determined by making substitutions in Equation 4 as follows. The values of $k = 0.4646$ microns$^{-1}$ and $\gamma = 0.2166$ microns$^{-1}$, determined above in calculating the thickness c of tubular guiding core, are substituted in Equation 4. The propagation phase constant $\beta = 6.3663$ microns$^{-1}$ is determined from Equation 4a. The absolute value of the reflection coefficient $|R|$, is obtained from Equation 5. The reflection coefficient is $$|R| = 0.99956$$

Substituting $|R|$ in Equation 4b, the parameter U is $$U = 33.888.$$

Substituting the values of $\beta = 6.2663$, $k = 0.4646$, $\gamma = 0.2166$ and $U = 33.888$ in Equation 4, to obtain the coupling length, $$L = 2646 \text{ microns} = 2.646 \text{ millimeters}.$$

As stated for this specific example, the coupling lengths L and L' are the same. Thus the parameters of a complete optical coupler capable of 100% optical power transmission have been defined in accordance with the present invention.

The alternative coupler 20a shown in FIG. 3 is substantially the same as shown in FIG. 1 except that the end surfaces 37a, 37a are in direct, end to end contact in the center of the tubular waveguide 21. Thus, the extra-length plugs 29a of cladding 27 at the end portions of the optical fiber guiding cores 22 and 24 completely fill the annular gap between cores 22, 24 and the tubular waveguide 21. Epoxy, or simply a tight fit, may be used to hold the coupler assembled as shown in FIG. 3.

A practical advantage results from the form of coupler shown in FIG. 3. If, for some reason, such as difficult assembling conditions in the field, the coupling lengths L and L' are not precisely right but L and L' should be two times the formula (4) so that transverse optical power transfer in the direction of arrow 36 is less than 100%, some of the remainder may transfer end to end through contacting end faces 37a, 37a. This is especially advantageous where the end surfaces 39/39 (shown in broken lines in FIG. 3) are not perfectly polished.

An important feature of the invention is that optical power transfer between the optical fibers 16 and 18 and the tubular waveguide 21 are transverse to the longitudinal axis z—z. If precisely made in accordance with the relationships described and illustrated above, there will be no direct end to end power transfer between the fibers 16 and 18. An axial gap s therefore can be provided between the ends of the optical fiber guiding cores 22 and 24 without affecting optical power transfer. In fact, this could be demonstrated by placing an opaque member in the gap s to block out any possibility of direct transmission. The equations disclosed above, and practical applications of the invention in single and multimode optical transmissions, plus an extensive bibliography, are disclosed in applicant's thesis, published July 16, 1979 on "COUPLING THEORY FOR OPTICAL WAVEGUIDE AND OPTICAL FIBERS". This was submitted in partial fulfillment of the requirements for the degree of Doctor of Philosophy in Electrical Engineering in the Graduate College of the University of Illinois, Chicago Circle Campus, Chicago, Ill. A copy of that thesis is available at the University of Illinois and reference may be had to it for additional theoretical background and practical applications which would be inappropriate to include in the present description because of the great volume of information presented. Applicant, however, wishes to incorporate this thesis by way of reference to augment the disclosure herein for anyone deserving such additional details.

While certain novel features of this invention have been shown and described and are pointed out in the annexed claims and in the above mentioned thesis which is desired to be incorporated by reference, it will be understood that various omissions, substitutions and changes in the forms and details of the optical fiber coupler illustrated and in its operation can be made by those skilled in the art without departing from the spirit of the invention.

The embodiments of the invention in which an exclusive property or privilege is claimed are defined as follows:

1. An optical fiber coupler comprising:
   an elongated optical fiber having a central light guiding core of light-transmitting material, said core having a predetermined cross-section with an end portion characterized by an outer wall surface and an end wall surface;
   an elongated tubular waveguide having a tubular light guiding core of light-transmitting material having a predetermined cross-section with inner and outer wall surfaces surrounding and enclosing said end portion of said central light guiding core;
   said elongated optical fiber and said tubular waveguide being coaxial, said end portion of said central light guiding core having a predetermined coupling length extending into said tubular light guiding core and being spaced radially inwardly from said inner wall surface a uniform distance along the length thereof to provide a circumferential gap therebetween which has a uniform cross-section along the length thereof;
   a light-transmitting spacer member filling said gap;

said central and tubular light guiding cores comprising material having a predetermined refractive index, said spacer member comprising material having a refractive index less than said predetermined refractive index; and the cross-sectional dimensions of said central and tubular light guiding cores and said coupling length having predetermined values chosen according to Equations (3) and (4) enabling transverse optical power transfer through said circumferential gap between the central and tubular light guiding cores with minimal optical power transfer through said end unit surface of the central light guiding core.

2. An optical fiber coupler according to claim 1 in which both of said central and tubular light guiding cores have coatings of optical cladding material, and the refractive indexes of the spacer number material and cladding material are equal.

3. An optical fiber coupler according to claim 1 in which said central light guiding core has a circular cross-section, and said tubular light guiding core comprises a cylinder of annular cross section.

4. An optical fiber coupler according to claim 3 in which the wall thickness of said tubular light guiding core is an optimum dimension for which forward transfer of optical power between said central and tubular light guiding cores from an optical power source is at a maximum, and reverse transmission therebetween comprising reflection toward said optical power source is at a minimum.

5. An optical fiber coupler according to claim 4 in which the transverse propogation constant k and the transverse attenuation constant $\gamma$ in Equation (3) are determined by the relationships set forth in Equations (1) and (2).

6. An optical fiber coupler according to claim 3 in which said predetermined coupling length is an optimum dimension for which forward transfer of optical power between said central and tubular light guiding cores from an optical power source is at a maximum, and reverse transmission therebetween comprising reflection toward said optical power source is at a minimum.

7. An optical fiber coupler according to claim 6 in which said coupling length of said end portion of said optical fiber guiding core is determined by the relationships set forth in Equations (4), (4a) and (4b) and the transverse propogation constant k and the transverse attenuation constant $\gamma$ required in Equations (4), (4a) and (4b) are determined by the relationships set forth in Equations (1) and (2).

8. An optical fiber coupler according to claim 3 in which the thickness of said tubular light guiding core and said coupling length are optimum dimensions to maximize forward transfer of optical power between said central and tubular light guiding cores from an optical power source, and to minimize reverse transmission therebetween comprising reflection toward said optical power source.

9. An optical fiber coupler comprising:
a pair of elongated optical fibers having central light guiding cores of light-transmitting material, each of said cores having a predetermined cross-section with an end portion characterized by an outer wall surface and an end wall surface;
an elongated tubular waveguide having a tubular light guiding core of light-transmitting material having a predetermined cross-section with inner and outer wall surfaces surrounding and enclosing said end portions of said central light guiding cores and having recesses at opposite ends;
said end portions extending coaxially into said opposite recesses;
each of said end portions having a predetermined coupling length extending into the corresponding recess and being spaced radially inwardly from said inner wall surface a uniform distance along the length thereof to provide a circumferential gap therebetween which has a uniform cross-section along the length thereof;
a light-transmitting spacer member filling said gap;
said central and tubular light guiding cores comprising material having the same predetermined refractive index, and said spacer member comprising material having a refractive index less than said predetermined refractive index; and
the cross-sectional dimensions of said central and tubular light guiding cores and each of said coupling lengths having predetermined values chosen according to Equations (3) and (4) enabling maximum transverse optical power transfer through both of said circumferential gaps in series, with minimal, longitudinal optical power transfer between said end wall surfaces of the central light guiding cores.

10. An optical fiber coupler according to claim 9 in which the end wall surfaces of said central light guiding cores are in abutting contact within said tubular light guiding core.

11. An optical fiber coupler according to claim 10 in which said end wall surfaces of said central light guiding cores abut midway between the ends of the tubular light guiding core.

12. An optical fiber coupler according to claim 10 in which said end wall surfaces of said central light guiding cores abut at a location offset from a location midway between the ends of the tubular light guiding core.

13. An optical fiber coupler according to claim 9 having an axial gap between said end wall surfaces of said central light guiding cores.

14. An optical fiber coupler according to claim 13 in which the central and tubular light guiding cores have a cladding material with a refractive index less than said predetermined refractive index, and at least a portion of said spacer members comprises plugs of said cladding material extending into said recesses.

15. A method of transferring optical power between a central light guiding core and a tubular light guiding core, both of which cores comprise light-transmitting materials having the same predetermined refractive index, said method including the steps of:
(a) assembling said central light guiding core within said tubular light guiding core a uniform radial distance along the length thereof with said central and tubular light guiding cores extending along a common axis;
(b) filling the circumferential gap between said cores with light-transmitting spacer material having a refractive index less than said predetermined refractive index; and
(c) applying optical power to one of said light guiding cores and transferring said power transversely of said axis through said spacer material into the other of said light guiding cores.

16. A method of transferring optical power from a first central light guiding core to a second central light guiding core, both of said cores comprising light-transmitting material having the same predetermined refractive index, said method including the steps of:

(a) assembling said first and second central light guiding cores along an axis with adjacent ends facing one another;

(b) enclosing adjacent end portions of said central light guiding cores coaxially within opposite end recesses of a tubular light guiding core with each of said first and second light guiding cores being spaced a uniform radial distance within the tubular light guiding core along the length thereof, said tubular light guiding core comprising light-transmitting material having a refractive index equal to said predetermined refractive index;

(c) filling circumferential gaps between said first and second central light guiding cores and said tubular light guiding core with light-transmitting spacer material having a refractive index less than said predetermined refractive index;

(d) directing optical power longitudinally of said axis along the interior of said first central light guiding core toward said tubular light guiding core;

(e) transferring said optical power transversely of said axis into said tubular light guiding core; and (f) re-transferring said optical power transverely of said axis into said second central light guiding core.

* * * * *